March 25, 1924.
E. E. SWEET
1,487,986
TANK FOR TRACTORS, ETC
Filed April 23, 1920
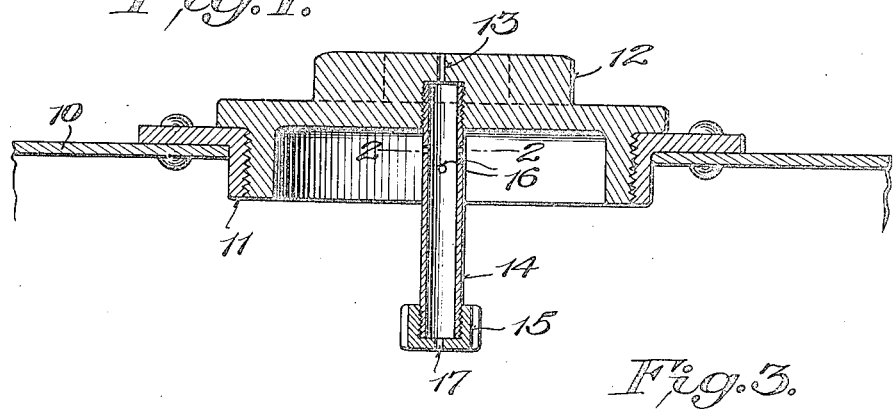
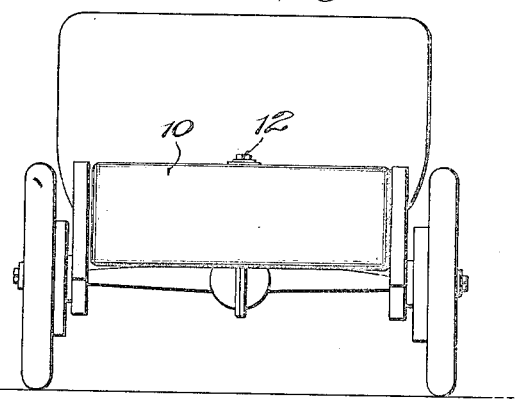
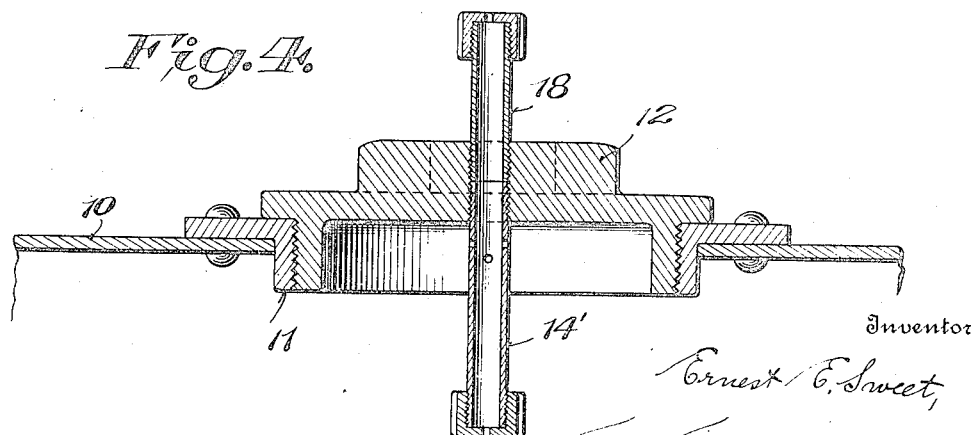
Inventor
Ernest E. Sweet,
By Foster, Freeman, Watson & Coit,
Attorneys Patented Mar. 25, 1924.

1,487,986

UNITED STATES PATENT OFFICE.

ERNEST E. SWEET, OF DETROIT, MICHIGAN, ASSIGNOR, BY MESNE ASSIGNMENTS, TO HAROLD H. EMMONS, OF DETROIT, MICHIGAN.

TANK FOR TRACTORS, ETC.

Application filed April 23, 1920. Serial No. 376,050.

*To all whom it may concern:*

Be it known that I, ERNEST E. SWEET, a citizen of the United States, and residing at Detroit, Wayne County, State of Michigan, have invented certain new and useful Improvements in Tanks for Tractors, Etc., of which the following is a specification.

This invention relates to liquid tanks adapted to be carried on vehicles and particularly to gasoline or other fuel tanks for automobiles and tractors.

It has been a considerable source of annoyance to drivers and operators of automobiles and tractors to have the gasoline contained in the fuel tank splash up and out of the same through the small orifice in the cap which is necessarily there to permit the ingress of air to replace the fuel withdrawn and supplied to the engine. This orifice or air port although small in size permits the escape by splashing of a considerable quantity of fuel during the course of a day, particularly when the vehicle carrying the tank is forced to pass over rough country, as particularly in the case of tractors crossing farm lands, or travelling along very rough roads. My invention comprises a tank in which the air port in the top is not in direct communication with the interior thereof thus preventing the liquid from splashing through, the means provided for thus preventing the splashing at the same time allowing the free ingress of air.

The invention will be fully disclosed in the following description when taken in connection with the accompanying drawings in which:—

Figure 1 is a cross sectional view of a portion of a tank showing the orifice through which the liquid is introduced, the cap therefor, the air port, and the anti-splash device incorporated therewith;

Figure 2 is a cross section along the line 2—2 of Figure 1;

Figure 3 is a perspective view of a vehicle showing the tank attached; and

Figure 4 is a modification.

The wall of the tank is indicated by the numeral 10 in the drawing, the annular flange encircling the opening through which the liquid is introduced by the numeral 11 and the cap or closure by the numeral 12, the flange-piece 11 and the cap 12 being correspondingly threaded in the usual manner to permit the ready removal of the cap to introduce or replenish the supply of liquid which the tank is adapted to carry.

In the case of gasoline tanks for automobiles and tractors it is necessary to leave a small orifice or air port, such as indicated at 13, through which air may enter from the outside as the fuel is withdrawn to supply the engine, to prevent the collapse of the tank in the case where a vacuum system of supply is employed or to insure a ready feed when the gravity method is utilized. This orifice 13 is made as small as possible in practice to prevent the escape of the fuel in the tank which splashes through when the vehicle is passing over rough ground. In some instances this amounts to as much as a pint or a quart of fuel in the course of a day, which is thrown over the machine and sometimes over its operators.

To prevent this splashing and wastage, I have secured to the underside of the cap, preferably by threading, as shown in the drawings, a short tube 14, the upper end of which is in communication with the air port 13 and to the lower end of which is threaded or otherwise suitably secured a small cap 15. The interior of the tube 14 communicates with the interior of the tank by means of four restricted ports or orifices 16 near its upper end and by means of a single restricted orifice 17 through the cap 15.

These orifices 16 and 17 while having ample cross sectional area to permit the entrance into the tank of air to replace the fuel withdrawn, are of such small size that the tube 14 is filled very slowly if the liquid has risen to such a level that they are completely submerged, as happens for short periods when the liquid is violently agitated, due to the movements of the tank. Before the tube can become filled the wave of liquid will have subsided and what has flowed into the tube will drain out through the lower orifice 17. It is obvious that no matter how violent the agitation of the liquid contained in the tank it cannot splash directly through the air port 13 into the outer air thereby effecting a saving of fuel in the case of automobiles and tractors and preventing the machine and the operators from coming in contact with it and entirely eliminating the danger of having the fuel jet from the tank into the outer air where it may easily become ignited and result in the destruction of the tank and vehicle.

As the movements of the vehicle carrying the tank are such that waves of liquid strike the downwardly projecting tube 14 from different directions, I have arranged the orifices 16 diametrically opposite in pairs in two different transverse planes so that when a wave strikes the tube in any given direction the liquid entering the port exposed to the wave will jet through the tube and will escape wholly or in part through the diametrically opposite port if the pressure is sufficient. This arrangement of the orifices 16 helps the tube remain empty, which is a condition to be desired.

In Figure 4 I have illustrated a modification in which the tube 18 extends upwardly in addition to the tube 14' extending downwardly within the tank, and it is obvious that other modifications of the invention may be made within the scope of the appended claims.

Having thus described the invention what is claimed as new and desired to be secured by Letters Patent is:—

1. A liquid tank for vehicles having a filler cap with an air port in the top thereof which is unobstructed at all times and means to prevent the escape of liquid by splashing through said port, said means comprising a hollow member within the tank and secured to the wall of said filler cap and having its interior in communication with said air port, the interior of said member being also in communication with the interior of the tank through restricted orifices in the wall of said member, and an orifice which is located at the lowest point of said member and serves as a drain opening for said member, thus preventing the liquid in the tank from splashing through the air port in the wall of the tank when agitated, while permitting the ingress of air.

2. A cap for vehicle fuel tanks having an air port therein which is unobstructed at all times and means to prevent wastage of fuel by splashing through said port, said means comprising a tubular member within the tank, secured to the under-side of said cap and having its interior in communication with said air port, a cap on the lower end of said tubular member having a restricted orifice therein affording communication between the interior of said tubular member and said tank and serving as a drain for said tubular member, and a restricted orifice in the wall of said member above the level of said cap.

In testimony whereof I affix my signature.

ERNEST E. SWEET.